(12) United States Patent
Singh et al.

(10) Patent No.: US 10,027,244 B2
(45) Date of Patent: Jul. 17, 2018

(54) ACTIVE VOLTAGE REGULATOR SYSTEMS AND METHODS

(71) Applicant: General Electric Company, Schenectady, NY (US)

(72) Inventors: Yash Veer Singh, Bangalore (IN); Arvind Kumar Tiwari, Bangalore (IN); Scott Brian Wright, Jacksonville, FL (US); Kapil Jha, Bangalore (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 123 days.

(21) Appl. No.: 15/188,761

(22) Filed: Jun. 21, 2016

(65) Prior Publication Data

US 2017/0366100 A1  Dec. 21, 2017

(51) Int. Cl.
*H02M 7/06* (2006.01)
*H02M 7/217* (2006.01)
(Continued)

(52) U.S. Cl.
CPC ............. *H02M 7/217* (2013.01); *B60R 16/02* (2013.01); *G08B 21/182* (2013.01); *H02M 7/06* (2013.01)

(58) Field of Classification Search
CPC ...... H02M 2/217; H02M 7/06; G08B 21/182; B60R 16/02
See application file for complete search history.

(56) References Cited

U.S. PATENT DOCUMENTS 6,838,860 B2   1/2005   Huggett et al.
7,586,204 B2   9/2009   Hess et al.
(Continued)

FOREIGN PATENT DOCUMENTS

EP   2448101 A1 *   5/2012   ............ H02M 7/219

OTHER PUBLICATIONS

Mason, Lee S., et al.; "Experimental data for two different alternator configurations in a solar Brayton power system", Energy Conversion Engineering Conference, 1997 IECEC-97, Proceedings of the 32nd Intersociety, vol. 1, pp. 454-459, Jul. 27-Aug. 1, 1997, Honolulu, HI.
(Continued)

*Primary Examiner* — Robert Deberadinis
(74) *Attorney, Agent, or Firm* — GE Global Patent Operation; Nitin Joshi (57) ABSTRACT

A power conditioning unit used in an electrical system. The power conditioning unit includes a positive bus and a negative bus that are electrically connected to a direct current load to enable supplying direct current electrical power to the direct current load; and a first phase leg, which includes a first diode electrically connected to the positive bus, a first transistor electrically connected to the negative bus, and a first node between the first diode and the first transistor. The first node is electrically connected to an alternating current power source to enable the first phase leg to receive a first phase of alternating current electrical power from the alternating current power source and the first transistor opens and closes to control flow of the first phase through the first phase leg to facilitate generating the direct current electrical power at a target voltage using the alternating current electrical power.

18 Claims, 5 Drawing Sheets

(51) Int. Cl.
    *G08B 21/18*     (2006.01)
    *B60R 16/02*     (2006.01)

(56) References Cited

U.S. PATENT DOCUMENTS

| | | |
|---|---|---|
| 7,848,123 B2 | 12/2010 | Hess |
| 8,050,004 B2 | 11/2011 | Collins et al. |
| 8,576,522 B2 | 11/2013 | Beneditz et al. |
| 8,692,501 B2 | 4/2014 | Hess et al. |
| 2003/0128563 A1* | 7/2003 | Rojas Romero .... H02M 1/4216 363/89 |
| 2014/0157818 A1 | 6/2014 | Burchill |
| 2015/0280528 A1 | 10/2015 | Collins |
| 2017/0279287 A1* | 9/2017 | Solodovnik ........... H02J 7/0052 |

OTHER PUBLICATIONS

Naidu, Malakondaiah, et al.; "A novel power generation system for ground vehicles", Digital Avionics Systems Coference, 1999 Proceedings 18th, vol. 2, pp. 18.C.4-1-8.C.4-10, 1999, St Louis, MO.

* cited by examiner

ACTIVE VOLTAGE REGULATOR SYSTEMS AND METHODS

BACKGROUND

The present disclosure generally relates to alternating current (AC) to direct current (DC) converters and, more specifically, to active AC to DC rectifier and voltage regulators.

Generally, electrical power may either be AC electrical power or DC electrical power. In some instances, the type of electrical power supplied by a power source may be different from the type of electrical power an electrical load is designed to use. For example, an AC power source (e.g., a power grid) may supply AC electrical power, and a DC load (e.g., a computer) may be designed to operate using DC electrical power. As such, a rectifier may be used to convert the AC electrical power received from the AC power source into DC electrical power.

Additionally, in some instances, electrical loads may be designed to operate using voltages within a specific range. For example, a DC load may be designed to operate using DC electrical power with a voltage between twenty-seven to twenty-nine volts. As such, a voltage regulator may be used to control voltage of the DC electrical power supplied to the DC load.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a power conditioning unit used in an electrical system includes a positive bus and a negative bus that are electrically connected to a direct current load to enable supplying direct current electrical power to the direct current load; and a first phase leg, which includes a first diode electrically connected to the positive bus, a first transistor electrically connected to the negative bus, and a first node between the first diode and the first transistor. The first node is electrically connected to an alternating current power source to enable the first phase leg to receive a first phase of alternating current electrical power from the alternating current power source and the first transistor opens and closes to control flow of the first phase through the first phase leg to facilitate generating the direct current electrical power at a target voltage using the alternating current electrical power.

In another embodiment, a tangible, non-transitory, computer-readable medium stores instructions executable by one or more processors in an electrical system. The instructions includes instructions to determine, using the one or more processors, a control signal, in which the control signal includes a pulse-width modulated signal used to facilitate controlling operation of a power conditioning unit; determine, using the one or more processors, a first switching signal based at least in part on the control signal and a first current polarity of a first phase of alternating current electrical power supplied to a first phase leg of the power conditioning unit from an alternating current power source; instruct, using the one or more processors, a first switching device on the first phase leg to open or close by supplying the first switching signal to the first switching device to facilitate converting the alternating current electrical power into direct current electrical power supplied from the power conditioning unit to a direct current load; determine, using the one or more processors, a first voltage of the direct current electrical power; and adjust, using the one or more processors, duty cycle of the control signal to adjust the first voltage of the direct current electrical power.

In another embodiment, a method for controlling operation of a power conditioning unit in an electrical system includes determining, using a controller in the electrical system, a voltage of direct current electrical power supplied from the power conditioning unit to a direct current load; instructing, using the controller, a plurality of switching devices to increase closed duration when the voltage of the direct current electrical power is greater than a target voltage the direct current load is designed to consume, in which the power conditioning unit includes a plurality of phase legs that each receives one phase of alternating current electrical power from a respective winding in an alternating current power source and each includes one of the plurality of switching devices and a diode; and instructing, using the controller, the plurality of switching devices to decrease the closed duration when the voltage of the direct current electrical power is less than the target voltage.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As mentioned above, a rectifier may be used to convert AC electrical power received from an AC power source into DC electrical power. Accordingly, voltage of the DC electrical power output from a passive rectifier, such as a bridge rectifier, may be dependent on voltage of the AC electrical power received from the AC power source. In some instances, voltage of the AC electrical power may vary, for example, when the AC power source is an alternator in an automotive vehicle. In such instances, voltage of the AC electrical power generated by the AC power source may vary based on speed of the internal combustion engine, thereby affecting voltage of the DC electrical power output from the rectifier.

Additionally, as mentioned above, a voltage regulator may be used to control voltage of the DC electrical power supplied to a DC load. Specifically, the DC load may be designed to operate with voltage within a specific range. Accordingly, the voltage regulator may adjust voltage of received DC electrical power to be within the specific range and output the voltage adjusted DC electrical power to the DC load.

In some instances, the rectifier and voltage regulator may be implemented as separate stages. For example, the rectifier may be a standard diode bridge rectifier that, in a first stage, converts the AC electrical power into DC electrical power. Additionally, the voltage regulator may be a shunt regulator that, in a second stage, adjusts voltage of the DC electrical power output from the bridge rectifier and outputs the voltage regulated DC electrical power to the DC load. In such instances, the bridge rectifier may include two diodes per phase of the AC electrical power and the shunt regulator may include a single switching device, another diode, and a filter.

Generally, at least compared to a switching device, a diode may consume more electrical energy when conducting current. In other words, power consumption may be directly related to duration diodes in the rectifier are conducting current. In fact, in the bridge rectifier, at least one diode per phase is conducting current whenever AC electrical power is supplied.

In some instances, the rectifier may be used in high temperature environments, such as near an internal combustion engine in the automotive vehicle. Additionally, the electrical energy consumed by a diode may be dissipated as heat. In other words, the dissipated heat may further increase temperature of the rectifier and/or the voltage regulator. In some instances, life span and/or operational reliability of the rectifier and/or the voltage rectifier may be reduced as temperature increases. In other words, implementing a two stage rectifier and voltage regulator (e.g., a bridge rectifier and shunt voltage regulator) may limit energy usage efficiency, life span, and/or operational reliability.

Accordingly, the present disclosure provides techniques to implement a single stage rectifier and voltage regulator, which may improve energy usage efficiency, life span, and/or operational reliability. For example, the single stage may be implemented by a power conditioning unit. In some embodiments, the power conditioning unit may include a single diode per phase, a single switching device per phase, and a filter (e.g., a capacitor with an inductor).

In operation, each switching device of the disclosed system may be controlled based at least in part on polarity of AC current and/or voltage supplied to its corresponding phase leg. For example, the switching device on a phase leg may be closed when input current to the phase leg is negative, thereby recirculating AC electrical power back to the AC power source. On the other hand, when the current received by the phase leg is positive, the switching device may be opened and closed to control duration the phase leg supplies electrical power to the DC load. Specifically, when the input current is positive and the switching device is open, the input AC electrical power may flow through a diode on the phase leg to a positive bus, which may be electrically connected to the DC load. On the other hand, when the input current is positive and the switching device is closed, the input AC electrical power may instead flow through the switching device to a negative (e.g., ground) bus.

Accordingly, for embodiment of the preset approach, increasing duration the switching device is open may increase duration electrical power is supplied to the positive bus, thereby increasing voltage of the output DC electrical power. On the other hand, decreasing duration the switching device is open may decrease duration electrical power is supplied to the positive bus, thereby decrease voltage of the output DC electrical power. Thus, by operating a switching device on each of the phase leg in this manner, the disclosed power conditioning unit may be used to control voltage of the DC electrical power supplied to the DC load, for example, such that the output DC voltage is within a specific range designed to be used by the DC load.

Additionally, when the presently disclosed system is operated in this manner, duration current flows through the diodes may be reduced. Specifically, when the switching device on a phase leg is closed, current may flow through the switching device instead of the diode. As described above, the switching device may be closed when input current to the phase leg is negative and possibly for some duration when the input current is positive. In other words, current may be flowing through the diodes for less than or equal to half the duration AC electrical power is supplied to the power conditioning unit.

As such, compared to a two stage rectifier and voltage regulator, in which current is flowing through at least one diode per phase leg when AC electrical power is supplied, the presently disclosed power conditioning unit may reduce duration current flows through the diodes. In this manner, the power conditioning unit may reduce electrical energy consumption and, thus, generated heat. As described above, by reducing energy consumption, the disclosed power conditioning unit may improve energy usage efficiency. Additionally, by reducing amount of generated heat, the disclosed power conditioning unit may improve life span and/or operational reliability.

Moreover, embodiment of the disclosed power conditioning unit may reduce number of components used to supply DC electrical power to the DC load. As described above, the two stage rectifier and voltage regulator may be implemented using two diodes per phase leg, a switching device, another diode, and a filter. Thus, when three phase AC electrical power is supplied, the two stage rectifier and voltage regulator may include eight components in addition to the filter. On the other hand, the presently disclosed one stage power conditioning unit may be implemented using one diode and one switching device per phase leg and a filter. Thus, when three phase AC electrical power is supplied, the disclosed power conditioning unit may include six components in addition to the filter. By reducing number of components, the embodiments of the power conditioning unit may reduce size and/or implementation costs.

Figure 1:
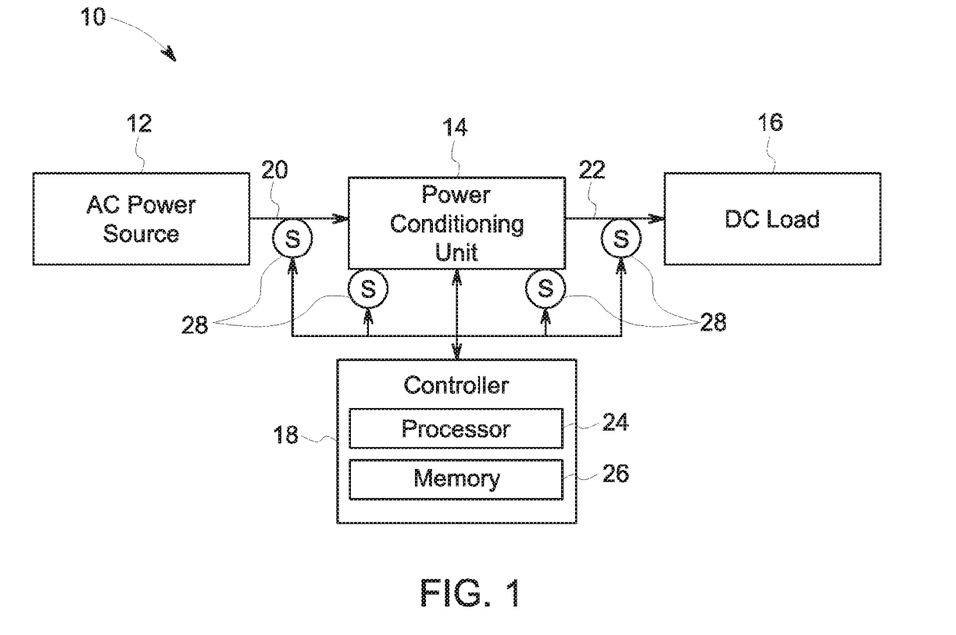
FIG. 1 is a block diagram of an electrical system, in accordance with an embodiment.

To help illustrate, one embodiment of an electrical system 10 is described in FIG. 1. In some embodiments, the electrical system 10 may be included in an industrial system, a manufacturing system, an automation system, or the like, such as a factory or plant. Additionally, in some embodiments, the electrical system 10 may be included in a computing system, such as a computer, or an automotive system, such as an airplane, boat, or car.

In the depicted embodiment, the electrical system 10 includes an AC power source 12, a power conditioning unit 14, a DC load 16, and a controller 18. As depicted, the AC power source 12 is electrically connected to the power conditioning unit 14 via a first electrical connection 20, which may enable the AC power source 12 to supply AC electrical power to the power conditioning unit 14. Accordingly, in some embodiments, the AC power source 12 may be a power grid, an AC power generator, an alternator, or the like.

Additionally, for the depicted embodiment, the power conditioning unit 14 is electrically connected the DC load 16 via a second electrical connection 22, which may enable the power conditioning unit 14 to supply DC electrical power to the DC load 16. In some embodiments, the DC load 16 may store the DC electrical power and/or use the DC electrical power to perform an operation. Accordingly, in some embodiments, the DC load 16 may be a battery, a computer, an engine control unit, a display, a light bulb, a heating, ventilating, and air conditioning (HVAC) system, or the like.

As described above, embodiment of the power conditioning unit 14 may operate to convert, in a single stage, AC electrical power received from the AC power source 12 into voltage regulated DC electrical power supplied to the DC load 16. To facilitate, the controller 18 may control operation of the power conditioning unit 14, for example, by instructing a switching device in the power conditioning unit 14 to open or close. Accordingly, the controller 18 may include a processor component 24 and a memory component 26. In some embodiments, the memory component 26 may include a tangible, non-transitory, computer readable medium that stores instructions executable by the processor component 24. Thus, in such embodiments, the memory component 26 may include random access memory (RAM), read only memory (ROM), rewritable non-volatile memory (e.g., flash memory), hard drives, optical discs, and the like. Additionally, the processor component 24 may include one or more general purpose microprocessors, one or more application specific processors (ASICs), one or more field programmable logic arrays (FPGAs), or any combination thereof. Additionally or alternatively, the controller 18 may utilize analog control based on op-amps and/or other circuitry.

As will be described in more detail below, in some embodiments, the controller 18 may control operation of the power conditioning unit 14 based at least in part on measured operational parameters of the power conditioning unit 14, such as current of input AC electrical power, voltage of input AC electrical power, current of output DC electrical power and/or voltage of output DC electrical power. To facilitate, one or more sensors 28 may be disposed on or coupled to the power conditioning unit 14, the first electrical connection 20, and/or the second electrical connection 22 to measure operational parameters. In some embodiments, the sensors 28 may include temperature sensors, pressure sensors, voltage sensors, current sensors, power sensors, or any combination thereof. The sensors 28 may then communicate the measured operational parameters to the controller 18 as sensor data.

Based at least in part on the measured operational parameters, the controller 18 may control operation of the power conditioning unit 14, for example, to convert AC electrical power received from the AC power source 12 into voltage regulated DC electrical power to be supplied to the DC load 16. As described above, for example, the controller 18 may control operation by instructing one or more switching devices in the power condition unit 14 to open or to close at specific times.

Figure 2:
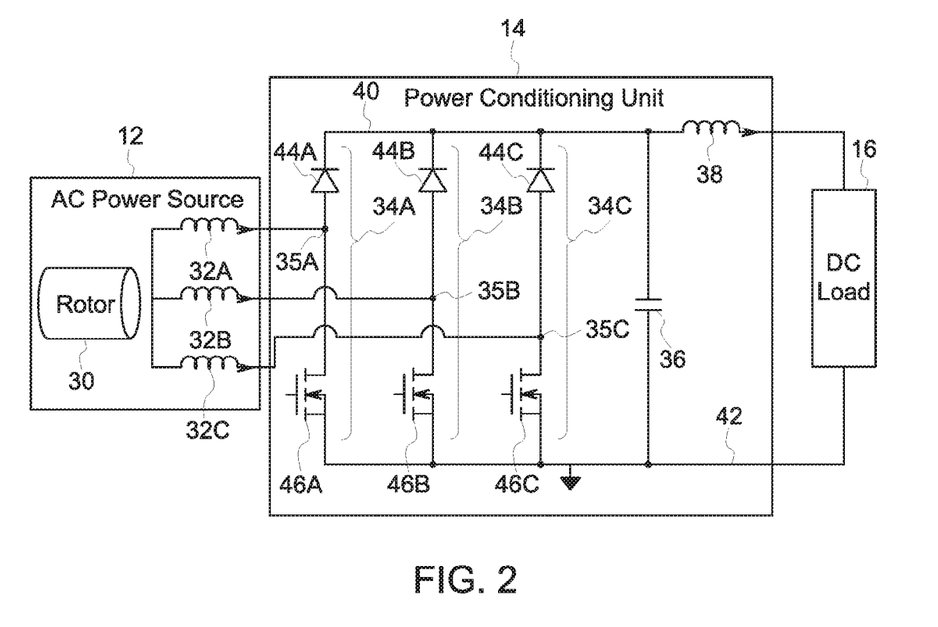
FIG. 2 is a schematic diagram of an alternating current (AC) power source and a power conditioning unit used in the electrical system of FIG. 1, in accordance with an embodiment.

To help illustrate, a more detailed view of one embodiment of the AC power source 12 and the power conditioning unit 14 are represented in FIG. 2. As described above, the AC power source 12 may be operated to generate AC electrical power. To facilitate, in the depicted embodiment, the AC power source 12 includes a rotor 30 and a stator, which includes a first winding 32A, a second winding 32B, and a third winding 32C. It should be appreciated that this configuration is merely intended to be illustrative. In other words, in other embodiments, the windings 32 may instead be located on the rotor 30.

With regard to the embodiment depicted in FIG. 2, the rotor 30 may generate a rotor magnetic field, for example, using a permanent magnet or an electromagnet. Additionally, in some embodiments, the rotor 30 may be mechanically coupled to a mechanical energy source, such as an internal combustion engine, a gas turbine, a steam turbine, a wind turbine, or the like. Thus, in operation, the mechanical energy source may actuate (e.g., rotate) the rotor 30 and, thus, the rotor magnetic field, thereby inducing voltage in the windings 32.

In some embodiments, the voltage induced in each winding 32 may be used to generate a different phase of the AC electrical power. For example, the rotor 30 may induce a first voltage in the first winding 32A to generate a first phase of the AC electrical power, a second voltage in the second winding 32B to generate a second phase of the AC electrical power, and a third voltage in the third winding 32C to generate a third phase of the AC electrical power. Thus, in the depicted embodiment, the AC power source 12 may generate three phase AC electrical power. It should be appreciated that the described embodiment is merely intended to illustrative and not limiting. In other words, in other embodiments, the AC power source 12 may use any number of windings 32 to generate any number of phases.

In some embodiments, voltage and/or frequency of AC electrical power may be dependent at least in part on actuation speed of the rotor 30. For example, when actuation speed of the rotor 30 increases, the rate of change of the rotor magnetic flux may increase, thereby increasing magnitude of voltage and/or frequency of the AC electrical power generated. On the other hand, when actuation speed of the rotor 30 decreases, the rate of change of the rotor magnetic flux may decrease, thereby decreasing magnitude of voltage and/or frequency of the AC electrical power generated. In other words, when the actuation speed of the rotor 30 varies, the voltage and/or frequency of AC electrical power output from the AC power source 12 may also vary.

As described above, the embodiments of the power conditioning unit 14 illustrated in FIG. 2 receives the AC electrical power generated by the AC power source 12 and converts the AC electrical power into voltage regulated DC electrical power supplied to the DC load 16. Thus, with regard to the depicted embodiment, the power condition unit 14 operates to convert the three-phase AC electrical power generated by the AC power source 12 into voltage regulated DC electrical power in a single step. To facilitate, the illustrated power conditioning unit 14 includes one phase leg 34 per phase of the AC electrical power and a filter, which in the depicted embodiment includes a capacitor 36 and an inductor 38.

With regard to the depicted embodiment, since the AC power source 12 generates three phase AC electrical power, the power conditioning unit 14 includes a first phase leg 34A, a second phase leg 34B, and a third phase leg 34C in parallel between a positive bus 40 and a negative (e.g., ground) bus 42. As depicted, the first phase leg 34A is electrically connected to the first winding 32A at a first node 35A, which enables the first phase leg 34A to receive the first phase of the AC electrical power from the first winding 32A. Additionally, the second phase leg 34B is electrically connected to the second winding 32B at a second node 35B, which enables the second phase leg 34B to receive the second phase of the AC electrical power from the second winding 32B. Furthermore, the third phase leg 34C is electrically connected to the third winding 32C at a third node 35C, which enables the third phase leg 34C to receive the third phase of the AC electrical power from the third winding 32C.

For the depicted embodiment of FIG. 2, each phase leg 34 includes a diode 44 and a switching device 46. For example, the first phase leg 34A includes a first diode 44A and a first switching device 46A, the second phase leg 34B includes a second diode 44B and a second switching device 46B, and the third phase leg 34C includes a third diode 44C and a third switching device 46C. In some embodiments, the diodes 44 (e.g., 44A-C) enable current to flow in a single direction. For example, in the depicted embodiment, the diodes 44 enable current to flow from a corresponding winding 32 (e.g., 32A-C) to the positive bus 40, and block current from flowing from the positive bus 40 to the windings 32 (e.g., 32A-C).

Additionally, the switching devices 46 illustrated in FIG. 2 may be closed enable bidirectional flow of current and opened to block current from flowing in either direction. For example, in the depicted embodiment, a switching device 46 (e.g., 46A-C) may be closed to enable current to flow from a corresponding winding 32 (e.g., 32A-C) to the negative bus 42 and current to flow from the negative bus 42 to the corresponding winding 32 (e.g., 32A-C). Thus, in some embodiments, each switching device 46 may include a solid-state switch and/or a mechanical switch. For example, a switching device 46 may include a wide band-gap transistor, such as a silicon carbide (SiC) transistor, a metal-oxide-semiconductor field-effect transistor (MOSFET), a field-effect transistor (FET), a bipolar junction transistor (BJT), an insulated-gate bipolar transistor (IGBT), or the like.

As described above, the controller 18 may control opening and closing of the switching devices 46 (e.g., 46A-C). In some embodiments, the controller 18 may use a switching signal to instruct a switching device 46 (e.g., 46A-C) to open and/or to close. For example, when the first switching device 46A includes a transistor, the controller 18 may instruct the first switching device 46A to close by increasing the switching signal applied to the gate of the first switching device 46A above a threshold voltage and to open by decreasing the switching signal below the threshold voltage. Accordingly, the controller 18 may use the switching device 46 to control supply of electrical power from each phase leg 34 (e.g., 34A-C) to the positive bus 40. As will be described in more detail below, in some embodiments, the controller 18 may control the supply of electrical power to the positive bus 40 in a manner that converts AC electrical power into DC electrical power and/or controlling voltage of the DC electrical power supplied to the DC load 16.

When converting multi-phase AC electrical power, the switching signal supplied to each switching device 46 (e.g., 46A-C) may vary. Thus, in some embodiments, the controller 18 may independently determine the switching signal supplied to each switching device 46. In other embodiments, to facilitate reducing computational complexity, the controller 18 may determine the switching signal supplied to each switching device 46 based on a single control signal, which may also facilitate controlling operation of the various phase legs 34.

Figure 3:
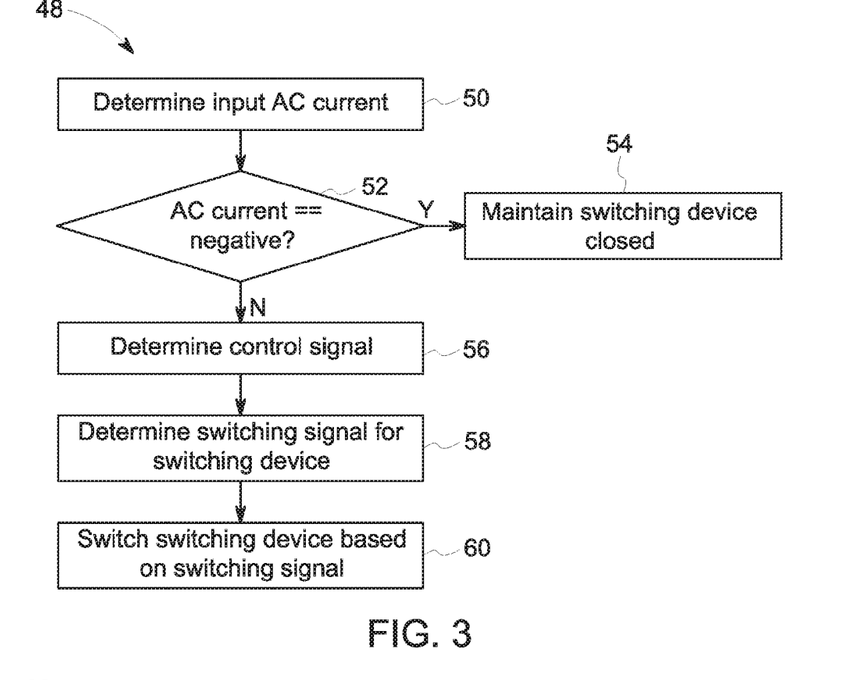
FIG. 3 is a flow diagram of a process for controlling operation of the power conditioning unit of FIG. 2, in accordance with an embodiment.

To help illustrate, one embodiment of a process 48 for controlling operation of a switching device 46 (e.g., 46A-C) on a phase leg 34 (e.g., 34A-C) is described in FIG. 3. Generally, the process 48 includes determining current of input AC electrical power (process block 50), determining whether the current is negative (decision block 52), and maintaining a switching device closed when the current is negative (process block 54). When the current is not negative, the process 48 includes determining a control signal (process block 56), determining a switching signal for the switching device (process block 58), and switching the switching device based on the switching signal (process block 60). In some embodiments, the process 48 may be implemented by executing instructions stored in a tangible, non-transitory, computer-readable medium, such as the memory component 26, using processing circuitry, such as the processor component 24.

Accordingly, in some embodiments, the controller 18 may determine current input to the phase leg 34 (e.g., 34A-C) from the AC power source 12 (process block 50). As described above, in some embodiments, sensors 28 may be coupled to the first electrical connection 20 and/or the power conditioning unit 14. In such embodiments, one or more sensors 28 may measure current flowing from the AC power source 12 to the phase leg 34 (e.g., 34A-C) and communicate the measured current to the controller 18 as sensor data. In other embodiments, one or more sensors 28 may measure other operational parameters (e.g., voltage or power) and communicate the measured operational parameters to the controller 18 as sensor data to enable the controller 18 to determine magnitude and/or polarity of the current based at least in part on the measured operational parameters.

Additionally, the controller 18 may determine whether polarity of the input current is negative (decision block 52). In some embodiments, the controller 18 may determine polarity of the input current based at least in part on what direction the input current is flowing. For example, when flowing from the AC power source 12 to the power conditioning unit 14, the controller 18 may determine that the input current is positive. On the other hand, when flowing from the power conditioning unit 14 to the AC power source 12, the controller 18 may determine that the input current is negative.

When the polarity of the input current is negative, the controller 18 may instruct the switching device 46 (e.g., 46A-C) to remain closed (process block 54). As described above, in some embodiments, the switching device 46 may be a transistor. Thus, in such embodiments, the controller 18 may instruct the switching device 46 to close by supplying a switching signal at a high state that is above a threshold voltage of the switching device 46 (e.g., transistor). When the switching device 46 is closed and the input current is negative, current may flow from the negative bus 42, through the switching device 46, and into a corresponding winding 32. In other words, AC electrical power may be circulated back into the AC power source 12.

On the other hand, when the polarity of the input current is not negative, the controller 18 may determine a control signal (process block 56) and determine a switching signal for the switching device 46 (e.g., 46A-C) based at least in part on the control signal (process block 58). In some embodiments, the control signal may be a pulse-width-modulated (PWM) signal that alternates between a high state and a low state. Additionally, in some embodiments, the controller 18 may determine the switching signal by setting the switching signal to the control signal for the duration the input current is not negative. In other words, when the input current is positive, the switching signal may be high when the control signal is high, and may be low when the control signal is low.

Using the switching signal, the controller 18 may then instruct the switching device 46 (e.g., 46A-C) to open and/or to close (process block 60). As described above, in some embodiments, the high state of the switching signal may be greater than the threshold voltage of the switching device 46 (e.g., transistor), thereby closing the switching device 46. When the switching device 46 is closed and the input current is not negative, current may flow from the corresponding winding 32 through the switching device 46 into negative bus 42 and, thus, is not supplied to the DC load 16.

Additionally, in some embodiments, the low state of the switching signal may be less than the threshold voltage of the switching device 46 (e.g., transistor), thereby opening the switching device 46. When the switching device 46 is open and the input current is not negative, current may flow from the corresponding winding 32 through a corresponding diode 44 (e.g., 44A-C) to the positive bus 40, thereby supplying DC electrical power to the positive bus 40. In a similar manner, the controller 18 may control operation of switching device 46 in other phase legs 34 to supply DC electrical power to the positive bus 40. In the positive bus 40, the filter (e.g., capacitor 36 and inductor 38) may smooth the DC electrical power, thereby enabling the power conditioning unit 14 to supply a relatively constant voltage to the DC load 16.

Thus, voltage of the output DC electrical power may vary based at least in part on duration each phase leg 34 (e.g., 34A-C) supplies electrical power to the positive bus 40. For example, voltage of the output DC electrical power may be increased by increasing duration electrical power is supplied to the positive bus 40, and may be decreased by decreasing duration electrical power is supplied to the positive bus 40. As described above, the controller 18 may control duration electrical power is supplied to the positive bus 40 by instructing the switching devices 46 (e.g., 46A-C) to open and to close using switching signals. When the switching signals are determined based on a control signal, the controller 18 may adjust the duty cycle of the control signal to adjust duration electrical power is supplied to the positive bus 40 and, thus, control the voltage of the output DC electrical power.

Figure 4:
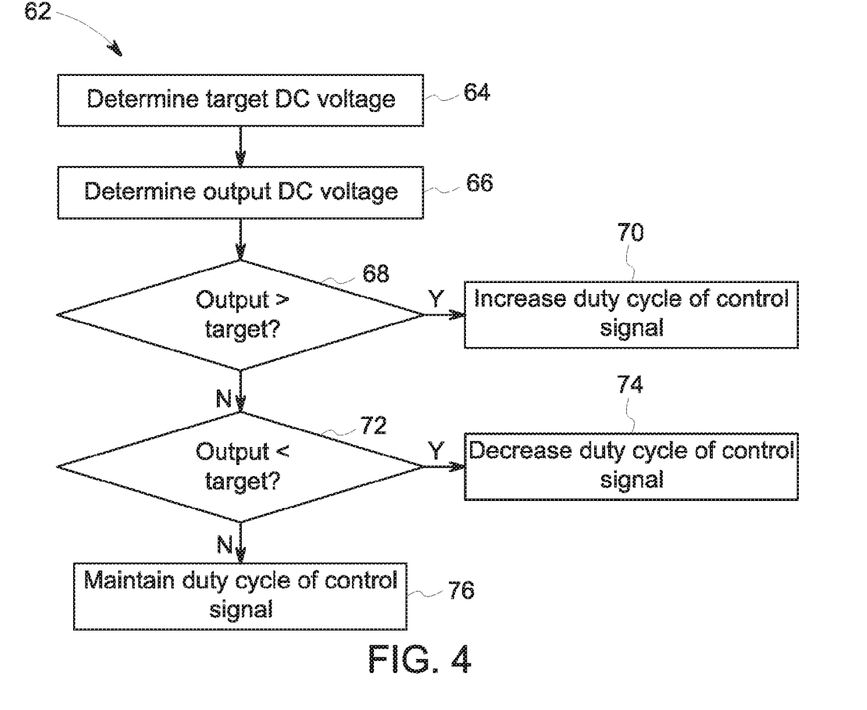
FIG. 4 is a flow diagram of another process for controlling voltage output from the power conditioning unit of FIG. 2, in accordance with an embodiment.

To help illustrate, one embodiment of a process 62 for determining a control signal is described in FIG. 4. Generally, the process 62 includes determining a target DC voltage (process block 64), determining an output DC voltage (process block 66), determining whether the output DC voltage is greater than the target DC voltage (decision block 68), and increasing duty cycle of a control signal when the output DC voltage is greater than the target DC voltage (process block 70). When the output voltage is not greater than the target DC voltage, the process 62 includes determining whether the output DC voltage is less than the target DC voltage (decision block 72), decreasing the duty cycle of the control signal when the output DC voltage is less than the target DC voltage (process block 74), and maintaining duty cycle of the control signal when the output DC voltage is not less than the target DC voltage (process block 76). In some embodiments, the process 62 may be implemented by executing instructions stored in a tangible, non-transitory, computer-readable medium, such as the memory component 26, using processing circuitry, such as the processor component 24 of the controller 18.

Accordingly, in some embodiments, the controller 18 may determine a target DC voltage to be supplied to the DC load 16 (process block 64). In some embodiments, the target DC voltage may be a voltage or a range of voltages the DC load 16 is designed to consume. Additionally, in some embodiments, the target DC voltage may be predetermined and stored in a tangible, non-transitory, computer-readable medium, such as the memory component 26 of the controller 18.

Additionally, the controller 18 may determine the voltage of DC electrical power output from the power conditioning unit 14 (process block 64). As described above, in some embodiments, sensors 28 may be coupled to the second electrical connection 22 and/or the power conditioning unit 14. In such embodiments, one or more sensors 28 may measure voltage of the DC electrical power output from the power conditioning unit 14 and communicate the measured voltage to the controller 18 as sensor data. In other embodiments, one or more sensors 28 may measure other operational parameters (e.g., current or power) and communicate the measured operational parameters to the controller 18 as sensor data to enable the controller 18 to determine the output DC voltage based at least in part on the measured operational parameters.

The controller 18 may then compare the output DC voltage with the target DC voltage to determine whether the output DC voltage is greater than the target DC voltage (decision block 68). When the output DC voltage is greater than the target DC voltage, the controller 18 may increase the duty cycle of the control signal (process block 70). As described above, the switching signal supplied to open and close a switching device 46 (e.g., 46A-C) may be determined based at least in part on the control signal. Thus, by increasing the duty cycle, the duration a switching signal supplied to the switching device 46 is high and, thus, the duration the switching device 46 is closed may be increased, thereby reducing duration electrical power is supplied to the positive bus 40 and, thus, voltage of the output DC electrical power.

Additionally, the controller 18 may compare the output DC voltage with the target DC voltage to determine whether the output DC voltage is less than the target DC voltage (decision block 70). When the output DC voltage is less than the target DC voltage, the controller 18 may decrease the duty cycle of the control signal. By decreasing the duty cycle, the duration the switching signal is high and, thus, the duration the switching device 46 (e.g., 46A-C) is closed may be decreased, thereby increasing the duration electrical power is supplied to the positive bus 40 and, thus, voltage of the output DC electrical power.

When the output DC voltage is not greater than the target DC voltage (e.g., a tolerance range) and not less than the target DC voltage, the controller 18 may maintain the duty cycle of the control signal. By maintaining the duty cycle, the duration the switching signal is high and, thus, the duration the switching device 46 (e.g., 46A-C) is closed may be maintained, thereby maintaining the duration electrical power is supplied to the positive bus 40 and, thus, voltage of the output electrical power.

In this manner, the controller 18 may adjust duty cycle of the control signal to maintain voltage of the DC electrical power supplied to the DC load 16 at or near the target DC voltage. Moreover, since used to determine the switching signal supplied to each switching device 46 (e.g., 46A-C), the controller 18 may adjust the duty cycle of the control signal to relatively uniformly adjust duration each phase leg 34 (e.g., 34A-C) supplies electrical power to the positive bus 40.

Figure 5:
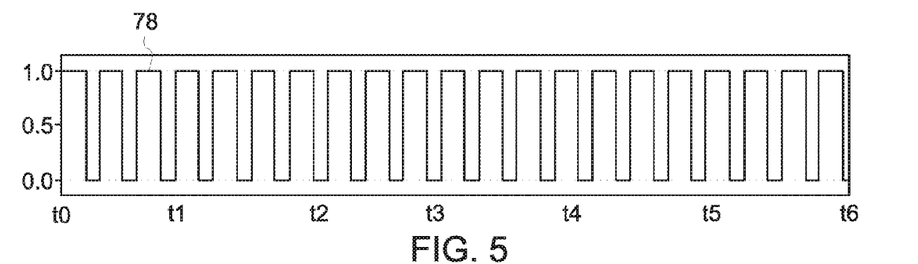
FIG. 5 is a plot of a control signal supplied to the power conditioning unit of FIG. 2, in accordance with an embodiment.

To help illustrate, FIG. 5 depicts a plot including a control signal curve 78 that describes an example embodiment of a control signal determined by the controller 18 between t0 and t6. As depicted, the control signal alternates between a high state and a low state between t0 and t6. Specifically, the control signal is in the high state approximately 60% and in the low state approximately 40% of its period.

Based on this control signal, FIGS. 6A-6D depict plots describing operational parameters of the first phase leg 34A between t0 and t6. Specifically, FIG. 6A includes a first input current curve 80 that describes input current to the first phase leg 34A. Additionally, FIG. 6B includes a first switching signal curve 82 that describes a first switching signal supplied to the first switching device 46A on the first phase leg 34A. Furthermore, FIG. 6C includes a first switching device voltage curve 84 that describes voltage across the first switching device 46A, and FIG. 6D includes a first switching device current curve 86 that describes current flowing through the first switching device 46A.

Figure 6A:
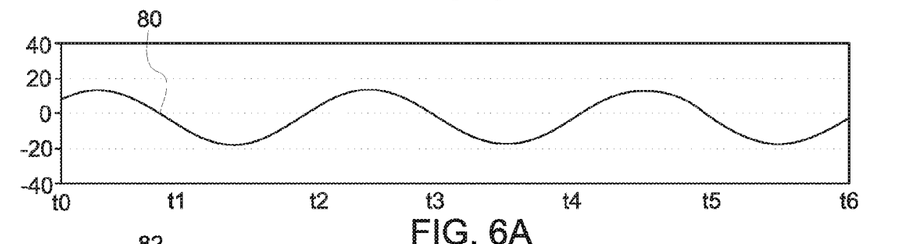
FIG. 6A is a plot of input current supplied to a phase leg in the power conditioning unit of FIG. 2, in accordance with an embodiment.
Figure 6B:
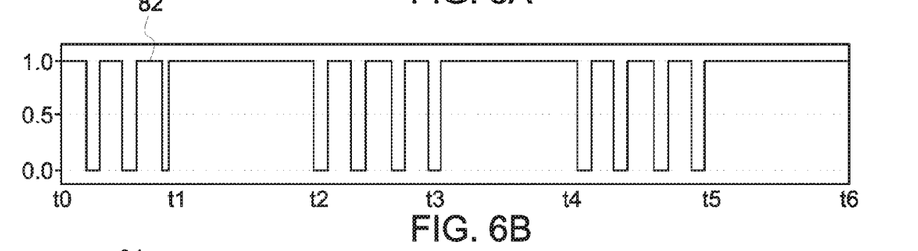
FIG. 6B is a plot of a switching signal used to control operation of a switching device in the phase leg determined based on the control signal of FIG. 5, in accordance with an embodiment.

As depicted in FIG. 6A, the input current to the first phase leg 34A is positive between t0 to t1, t2 to t3, and t4 to t5. As described above, when the input current to a phase leg 34 (e.g., 34A-C) is positive, the switching signal supplied to the corresponding switching device 46 (e.g., 46A-C) may be set to the control signal. Thus, as depicted in FIG. 6B, the switching signal supplied to the first switching device 46A is set to the control signal between t0 to t1, t2 to t3, and t4 to t5.

Figure 6C:
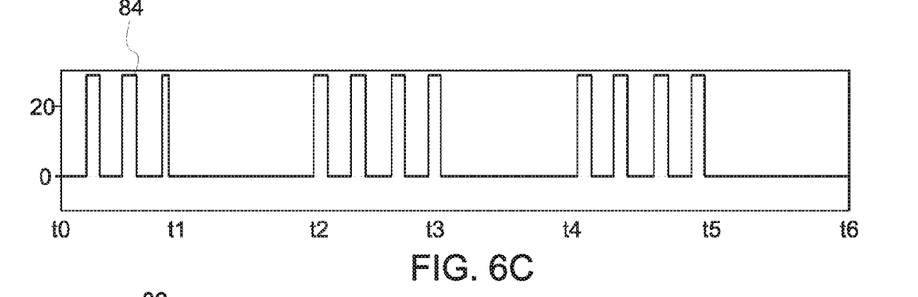
FIG. 6C is a plot of voltage across the switching device when the switching device is operated based on the switching signal of FIG. 6B, in accordance with embodiment.
Figure 6D:
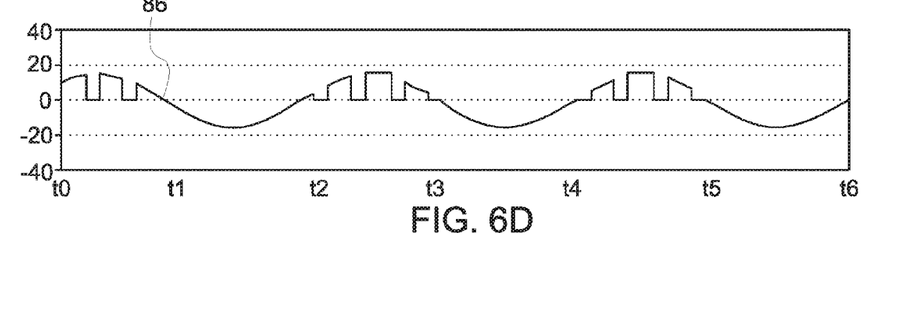
FIG. 6D is a plot of current flowing through the switching device when the switching device is operated based on the switching signal of FIG. 6B, in accordance with an embodiment.

Additionally, as described above, input current to a phase leg 34 (e.g., 34A-C) flows through the corresponding switching device 46 (e.g., 46A-C) when closed and through the corresponding diode 44 (e.g., 44A-C) when the switching device 46 is open and the input current is positive. Thus, as depicted in FIG. 6C, voltage across the first switching device 46A is zero when the first switching device 46A is closed, and is positive when the first switching device 46A is open between t0 to t1, t2 to t3, and t4 to t5. Additionally, as depicted in FIG. 6D, positive current flows through the first switching device 46A when the first switching device 46A is closed and zero current flows through the first switching device 46A when open between t0 to t1, t2 to t3, and t4 to t5.

Furthermore, as depicted in FIG. 6A, the input current to the first phase leg 34A is negative between t1 to t2, t3 to t4, and t5 to t6. As described above, when the input current to a phase leg 34 (e.g., 34A-C) is negative, the corresponding switching device 46 (e.g., 46A-C) may be held closed. Thus, as depicted in FIG. 6B, the switching signal supplied to the first switching device 46A is held in the high state, thereby closing the first switching device 46A between t1 to t2, t3 to t4, and t5 to t6.

Additionally, as described above, the input current to a phase leg 34 (e.g., 34A-C) flows through the corresponding switching device 46 (e.g., 46A-C) when closed. Thus, as depicted in FIG. 6C, voltage across the first switching device 46A is zero between t1 to t2, t3 to t4, and t5 to t6. Additionally, as depicted in FIG. 6D, negative current flows through the first switching device 46A between t1 to t2, t3 to t4, and t5 to t6.

As described above, in some embodiments, the power conditioning unit 14 may include multiple phase legs 34 (e.g., 34A-C) to facilitate converting multi-phase AC electrical power into voltage regulated DC electrical power. Additionally, to reduce computational complexity, the switching device 46 (e.g., 46A-C) on each of the phase legs 34 may be controlled based at least in part on the same control signal. In other words, each of the other switching devices 46 may be operated in a similar manner based on the control signal described in FIG. 5, thereby coordinating operation of the multiple phase legs 34

To help illustrate, FIGS. 7A-7D depict plots describing operational parameters of the second phase leg 34B and the third phase leg 34C between t0 and t6 in addition to the operational parameters of the first phase leg 34A described above. Specifically, FIG. 7A includes the first input current curve 80 that describes input current to the first phase let 34A, a second input current curve 88 that describes input current to the second phase leg 34B, and a third input current curve 90 that describes input current to the third phase leg 34C. Additionally, FIG. 7B includes the first switching signal curve 82 that describes the first switching signal supplied to the first switching device 46A, a second switching signal curve 92 that describes a second switching signal supplied to the second switching device 46B on the second phase leg 34B, and a third switching signal curve 94 that describes a third switching signal supplied to the third switching device 46C on the third phase leg 34C. Furthermore, FIG. 7C includes the first switching device voltage curve 84 that describes voltage across the first switching device 46A, a second switching device voltage curve 96 that describes voltage across the second switching device 46B, and a third switching device voltage curve 98 that describes voltage across the third switching device 46C. Additionally, FIG. 7D includes the first switching device current curve 86 that describes current flow through the first switching device 46A, a second switching device current curve 100 that describes current flowing through the second switching device 46B, and a third switching device current curve 102 that describes current flowing through the third switching device 46C.

Figure 7A:
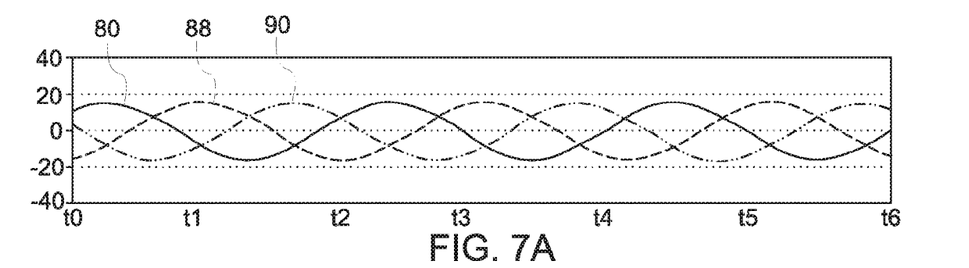
FIG. 7A is a plot of input currents supplied to multiple phase legs in the power conditioning unit of FIG. 2, in accordance with an embodiment.
Figure 7B:
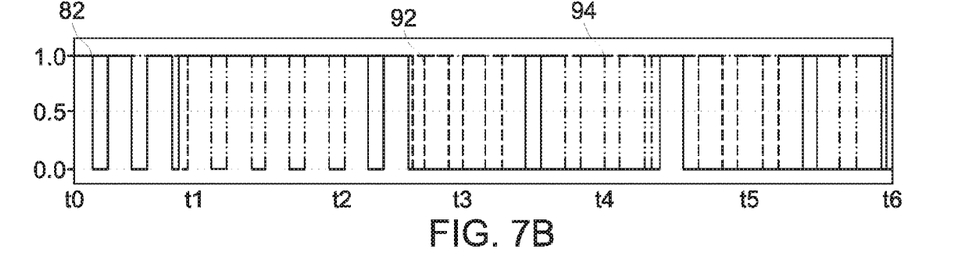
FIG. 7B is a plot of switching signals, each used to control operation of a switching device in each of the multiple phase legs, in accordance with an embodiment.
Figure 7C:
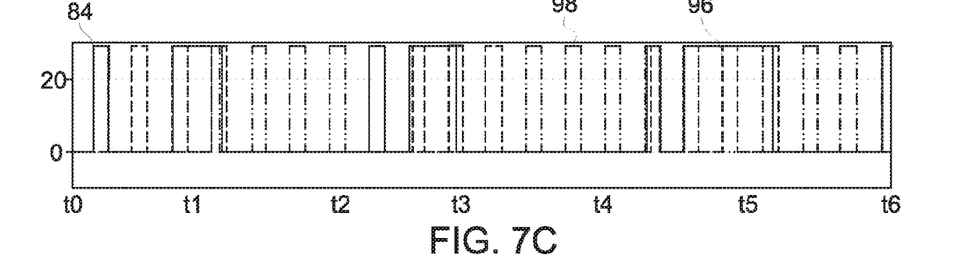
FIG. 7C is a plot of voltage across each of the multiple switching devices when operated based on the switching signals of FIG. 7B, in accordance with an embodiment.
Figure 7D:
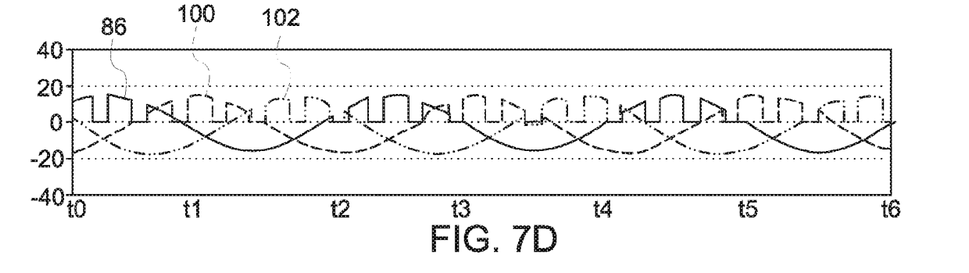
FIG. 7D is a plot of current through each of the multiple switching devices when operated based on the switching signals of FIG. 7B, in accordance with an embodiment.

As depicted in FIG. 7A, input current to the second phase leg 34B and input current to the third phase leg 34C may be approximately one-hundred twenty degrees out of phase with respect to the input current to the first phase leg 34A. Nevertheless, as depicted in FIG. 7B, similar to the first switching signal, the second switching signal supplied to the second switching device 46B and the third switching signal supplied to the third switching device 46C are determined based at least in part on the control signal of FIG. 5, as described above. As depicted in FIGS. 7C and 7D, operating according to the second switching signal, the second switching device 46B has voltage and current profiles similar to the first switching device 46A, but time shifted. Additionally, operating according to the third switching signal, the third switching device 46C has voltage and current profiles similar to the first switching device 46A and the second switching device 46B, but time shifted. In this manner, the controller 18 may use the control signal to coordinate the duration that each phase leg 34 (e.g., 34A-C) supplies electrical power to the positive bus 40 and, thus, control (e.g., regulate) voltage of the DC electrical power output from the power conditioning unit 14.

Figure 8:
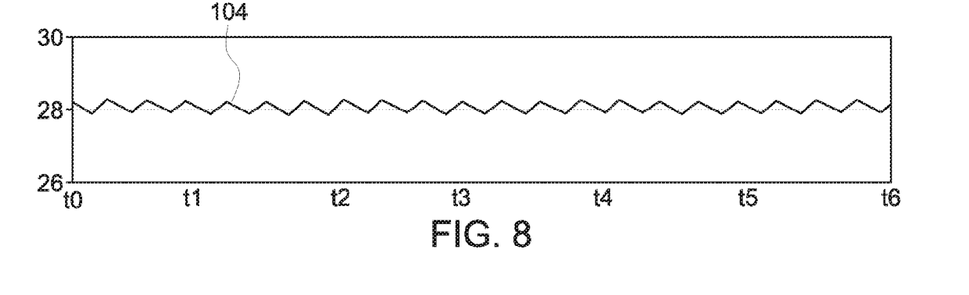
FIG. 8 is a plot of voltage output from the power conditioning unit of FIG. 2 when operated using the switching signals of FIG. 7B, in accordance with an embodiment.

To help illustrate, FIG. 8 depicts a plot including an output voltage curve 104 that describes voltage of the DC electrical power output from the power conditioning unit 14 when operated in the manner described in the example above with respect to FIGS. 5-7. As depicted, although fluctuating slightly, the output voltage is maintained between approximately 27.8 and 28.2 volts. In some embodiments, the magnitude of the fluctuation may be reduced by decreasing the period of the control signal.

Additionally, as described above, the magnitude of the output voltage may be controlled by adjusting duty cycle of the control signal—particularly when voltage of the input AC electrical power varies—to maintain the output voltage at a target voltage. Moreover, as described above, the power conditioning unit 14 may enable controlling the output voltage while reducing duration current flows through diodes. Specifically, current may be flowing through the diodes 44 (e.g., 44A-C) in the power conditioning unit 14 during less than or equal to half its operating duration, which may reduce power consumption and/or heat generation.

In addition to facilitating control of output voltage, including a switching device 46 (e.g., 46A-C) on each phase leg 34 (e.g., 34A-C) may provide additional functionality. For example, since a switching signal is supplied to each switching device 46, additional information relating to the operation of each phase leg 34 may be determined. In some embodiments, this may facilitate performing diagnostics, for example, to determine whether a fault is likely occurring in the AC power source 12, the power conditioning unit 14, and/or the DC load 16. In other words, sensing and processing the various voltages and current signals of the electrical system 10 may facilitate performing diagnostics and/or health monitoring of the power conditioning unit 14 and/or the alternating current power source 12.

Figure 9:
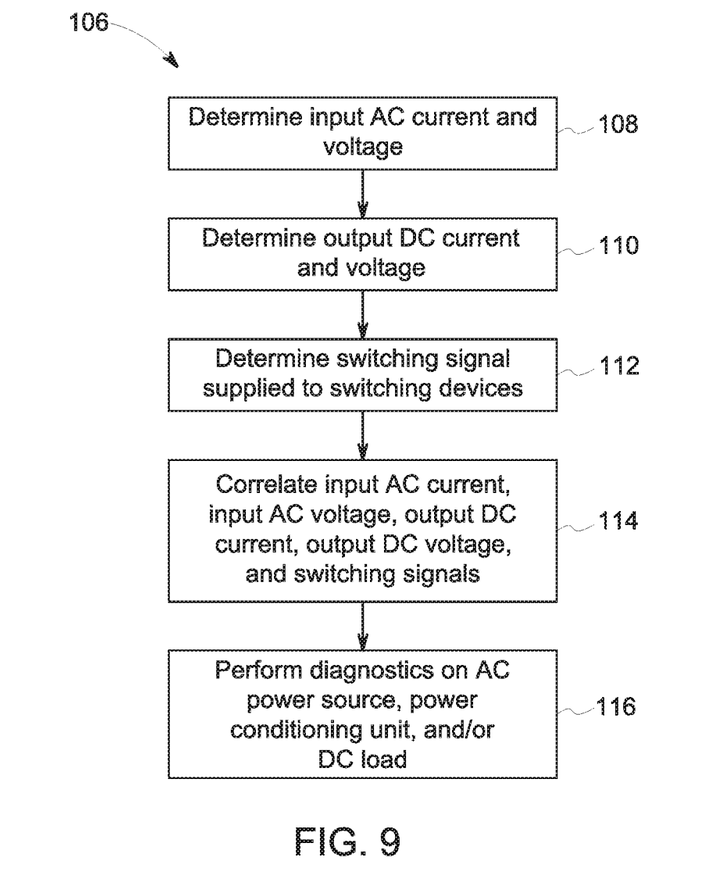
FIG. 9 is a flow diagram of a process for performing diagnostics on the electrical system of FIG. 1, in accordance with an embodiment.

To help illustrate, one embodiment of a process 106 for performing diagnostics on the power condition unit of FIG. 2 is described in FIG. 9. Generally, the process 106 includes determining input AC current and/or voltage (process block 108), determining output DC current and/or voltage (process block 110), determining switching signals supplied to switching devices (process block 112), correlating the input AC current, the input AC voltage, the output DC current, the output DC voltage, and/or the switching signals (process block 114), and performing diagnostics on an AC power source, a power conditioning unit, and/or a DC load (process block 116). In some embodiments, the process 106 may be implemented by executing instructions stored in a tangible, non-transitory, computer-readable medium, such as the memory component 26, using processing circuitry, such as the processor component 24.

Accordingly, in some embodiments, the controller 18 may determine current and/or voltage of AC electrical power supplied to the power conditioning unit 14 from the AC power source 12 (process block 108). As described above, in some embodiments, sensors 28 may be coupled to the first electrical connection 20 and/or the power conditioning unit 14. In such embodiments, one or more sensors 28 may measure current and/or voltage of the AC electrical power and communicate the measured current and/or voltage to the controller 18 as sensor data. In other embodiments, one or more sensors 28 may measure other operational parameters (e.g., power) and communicate the measured operational parameters to the controller 18 as sensor data to enable the controller 18 to determine the input current and/or input voltage.

Additionally, the controller 18 may determine current and/or voltage of DC electrical power supplied from the power conditioning unit 14 to the DC load 16 (process block 110). As described above, in some embodiments, sensors 28 may be coupled to the second electrical connection 22 and/or the power conditioning unit 14. In such embodiments, one or more sensors 28 may measure current and/or voltage of the DC electrical power and communicate the measured current and/or voltage to the controller 18 as sensor data. In other embodiments, one or more sensors 28 may measure other operational parameters (e.g., power) and communicate the measured operational parameters to the controller 18 as sensor data to enable the controller 18 to determine the output current and/or output voltage.

Furthermore, the controller 18 may determine switching signals supplied to each of the switching devices 46 (e.g., 46A-C) in the power conditioning unit 14 (process block 112). In some embodiments, the controller 18 may determine the switching signals using the process 48 described above. Additionally, in some embodiments, the controller 18 may store the switching signal supplied to each switching device 46 in the memory component 26. Thus, in such embodiments, the controller 18 may retrieve the switching signals from the memory component 26.

The controller 18 may then determine correlations between the switching signals, the input AC current, the input AC voltage, the output DC current, and/or the output DC voltage (process block 114) and perform diagnostics on the AC power source 12, the power conditioning unit 14, and/or the DC load 16 based at least in part on the correlations (process block 116). For example, the controller 18 may determine that there is potentially a fault in the AC power source 12 when the output DC voltage fluctuates beyond a threshold, input AC voltage fluctuates beyond a threshold, and/or duty cycles of the switching signals fluctuate beyond a threshold. Additionally, the controller 18 may determine that there is potentially a fault in the DC load 16 when the controller 18 determines that the input AC voltage and duty cycle of the switching signals should be sufficient to generate a target output voltage, and output DC voltage is still below a target output voltage.

In addition to facilitating diagnostics, including a switching device 46 (e.g., 46A-C) on each phase leg 34 (e.g., 34A-C) may improve control over operation of the power conditioning unit 14. For example, operation of each phase leg 34 may be independently controlled. In some embodiments, this may improve ability of the power conditioning 14 unit to mitigate faults in the AC power source 12, the power conditioning unit 14, and/or the DC load 16.

Figure 10:
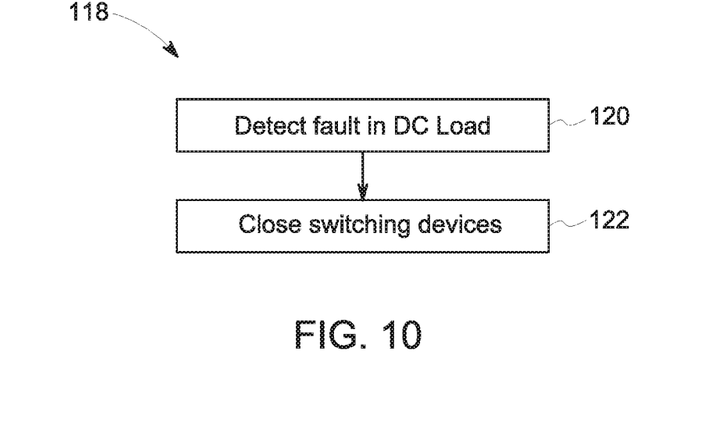
FIG. 10 is a flow diagram of a process for mitigating a fault detected in the electrical system of FIG. 1, in accordance with an embodiment.

To help illustrate, one embodiment of a process 118 for mitigating faults in the electrical system 10 of FIG. 1 is described in FIG. 10. Generally, the process 118 includes detecting a fault in a DC load (process block 120) and closing each of the switching devices (process block 122). In some embodiments, the process 118 may be implemented by executing instructions stored in a tangible, non-transitory, computer-readable medium, such as the memory component 26, using processing circuitry, such as the processor component 24.

Accordingly, in some embodiments, the controller 18 may detect a possible fault in the DC load 16 (process block 120). For example, the controller 18 may detect the possible fault by performing diagnostics using the process 106 described above. In some embodiments, the controller 18 may determine that a short circuit (e.g., a fault) is likely occurring in the DC load 16. As such, it may be desirable to stop supplying DC electrical power to the DC load 16, for example, to enable an operator access the DC load 16 and/or reduce the likelihood of exacerbating the fault.

However, in some instances, the AC power source 12 may continue supplying AC electrical power even after it ceases operation. As described above, in some embodiments, the rotor 30 may be actuated to induce voltage in the windings 32, thereby generating AC electrical power in the AC power source 12. However, even after actuation of the rotor 30 ceases, the windings 32 may resist change in current and, thus, continue supplying AC electrical power to the power condition unit 14 for a duration.

Thus, to block the remainder of the AC electrical power from being converted into DC electrical power supplied to the DC load 16, the controller 18 may instruct each of the switching devices 46 (e.g., 46A-C) to close (process block 122). In this manner, the power conditioning unit 14 may short the windings 32 of the AC power source 12, thereby blocking supply of DC electrical power to the DC load 16.

Accordingly, technical effects of the invention include improving energy usage efficiency, life span, and/or operational reliability of a power conditioning unit used to convert AC electrical power into voltage regulated DC electrical power in a single stage. In some embodiments, the power conditioning unit may include or one or more parallel phase legs, each of which includes or consists essentially of a diode and a switching device (e.g., a transistor). In such embodiments, the power conditioning unit may open and close a switching device to control supply of electrical power from the corresponding phase leg to a positive bus. For example, the power conditioning unit may open the switching device at least a portion of the duration when input current to the phase leg is positive, thereby causing the input current to flow through the diode to the positive bus and, thus, be used to generate DC electrical power. Moreover, the power conditioning unit may adjust duration the phase leg supplies electrical power to the positive bus to control voltage of the DC electrical power. Additionally, the power condition unit may close the switching device when the input current to the phase leg is negative. By operating in this manner, the power conditioning unit may conduct current through its diodes less than or equal to half its operating duration, which may reduce power consumption and heat generation and, thus, improve energy usage efficiency, life span, and/or operation reliability of the power conditioning unit.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A power conditioning unit configured to be used in an electrical system, comprising:
 a positive bus and a negative bus configured to be electrically connected to a direct current load to enable supplying direct current electrical power to the direct current load; and
 a first phase leg comprising a first diode electrically connected to the positive bus, a first transistor electrically connected to the negative bus, and a first node between the first diode and the first transistor, wherein:
  the first node is configured to be electrically connected to an alternating current power source to enable the first phase leg to receive a first phase of alternating current electrical power from the alternating current power source; and
  the first transistor is configured to open and close to control flow of the first phase through the first phase leg to facilitate generating the direct current electrical power at a target voltage using the alternating current electrical power;
 wherein the first transistor is configured to be:
 closed when current of the first phase is negative; and
  open at least a duration when the current of the first phase is positive, wherein the power conditioning unit is configured to adjust length of the duration that the first transistor is open to adjust voltage of the direct current electrical power.

2. The power conditioning unit of claim 1, comprising:
 a second phase leg coupled in parallel with the first phase leg between the positive bus and the negative bus, wherein the second phase leg comprises a second diode electrically connected to the positive bus, a second transistor electrically connected to the negative bus, and a second node between the second node and the second transistor, wherein:
  the second node is configured to be electrically connected to the alternating current power source to enable the second phase leg to receive a second phase of the alternating electrical power from the alternating current power source, wherein the second phase is sixty degrees out of phase with the first phase; and the second transistor is configured to open and close to control flow of the second phase through the second phase leg to facilitate generating the direct current electrical power at the target voltage using the alternating current electrical power; and a third phase leg coupled in parallel with the first phase leg and the second phase leg between the positive bus and the negative bus, wherein the third phase leg comprises a third diode electrically connected to the positive bus, a third transistor electrically connected to the negative bus, and a third node between the third node and the third transistor, wherein:

the third node is configured to be electrically connected to the alternating current power source to enable the third phase leg to receive a third phase of the alternating electrical power from the alternating current power source, wherein the third phase is sixty degrees out of phase with the first phase and the second phase; and the third transistor is configured to open and close to control flow of the third phase through the third phase leg to facilitate generating the direct current electrical power at the target voltage using the alternating current electrical power.

3. The power conditioning unit of claim 1, comprising one or more sensors configured to measure voltage of the direct current electrical power supplied from the power conditioning unit to the direct current load;

wherein the power conditioning unit is configured to:
increase duration the first transistor is closed when the voltage of the direct current electrical power is greater than the target voltage; and
decrease duration the first transistor is closed when the voltage of the direct current electrical power is less than the target voltage.

4. The power conditioning unit of claim 1, wherein:
the first diode is configured to supply the first phase to the positive bus when current of the first phase is positive and the first transistor is open; and
the first transistor is configured to enable the first phase to flow through the negative bus when the first transistor is closed.

5. The power conditioning unit of claim 1, comprising a filter configured to smooth the direct current electrical power before being supplied to the direct current load, wherein the filter comprises:
a capacitor in parallel with the first phase leg between the positive bus and the negative bus; and
an inductor electrically connected in the positive bus and configured to be coupled in series with the direct current load.

6. The power conditioning unit of claim 1, wherein the first transistor comprises a wide band-gap transistor, a silicon carbide transistor, a metal-oxide-semiconductor field-effect transistor, a field-effect transistor, a bipolar junction transistor, an insulated-gate bipolar transistor, or any combination thereof.

7. The power condition unit of claim 1, wherein the electrical system comprises an automotive vehicle comprising an alternator and an internal combustion engine, wherein:

the internal combustion engine is configured to actuate a rotor of the alternator; and
the alternating current power source comprises the alternator, wherein the alternator is configured to vary voltage, frequency, or both of the alternating current electrical power based at least in part on speed at which the internal combustion engine actuates the rotor.

8. The power conditioning unit of claim 1, comprising a controller configured to:
determine the target voltage;
determine voltage of the direct current electrical power supplied from the power conditioning unit to the direct current load;
adjust duty cycle of a control signal based at least in part on the target voltage and the voltage of the direct current electrical power, wherein the control signal alternates between a high state greater than a threshold voltage of the first transistor and a low state lower than the threshold voltage;
determine a polarity of the first phase of the alternating current electrical power;
determine a switching signal based at least in part on the control signal and the polarity of the first phase, wherein the switching signal is set to:
the high state when the polarity of the current is negative; and
the control signal when the polarity of the current is positive; and
supply the switching signal to a gate of the first transistor to instruct the first transistor to open or close.

9. A tangible, non-transitory, computer-readable medium configured to store instructions executable by one or more processors in an electrical system, wherein the instructions comprise instructions to:
determine, using the one or more processors, a control signal, wherein the control signal comprises a pulse-width modulated signal used to facilitate controlling operation of a power conditioning unit;
determine, using the one or more processors, a first switching signal based at least in part on the control signal and a first current polarity of a first phase of alternating current electrical power supplied to a first phase leg of the power conditioning unit from an alternating current power source;
instruct, using the one or more processors, a first switching device on the first phase leg to open or close by supplying the first switching signal to the first switching device to facilitate converting the alternating current electrical power into direct current electrical power supplied from the power conditioning unit to a direct current load;
determine, using the one or more processors, a first voltage of the direct current electrical power;
adjust, using the one or more processors, duty cycle of the control signal to adjust the first voltage of the direct current electrical power;
wherein the instructions to instruct the first switching device to open or close comprise instructions to:
signal the first switching device to close when the first current polarity is negative to enable current of the first phase to flow from a negative bus of the power condition unit to a winding of the alternating current power source; and
signal the first switching device to open at least a duration when the first current polarity is positive to enable the current of the first phase to flow from the winding through a diode in the first phase leg to a positive bus of the power condition unit.

10. The computer-readable medium of claim 9, comprising instructions to:
determine, using the one or more processors, a second switching signal based at least in part on the control signal and a second current polarity of a second phase of the alternating current electrical power supplied to a second phase leg of the power conditioning unit from the alternating current power source, wherein the second phase leg is coupled in parallel with the first phase leg;
instruct, using the one or more processors, a second switching device on the second phase leg to open or close by supplying the second switching signal to the second switching device to facilitate converting the alternating current electrical power into the direct current electrical power;
determine, using the one or more processors, a third switching signal based at least in part on the control signal and a third current polarity of a third phase of the alternating current electrical power supplied to a third phase leg of the power conditioning unit from the alternating current power source, wherein the third phase leg is coupled in parallel with the first phase leg and the second phase leg; and
instruct, using the one or more processors, a third switching device on the third phase leg to open or close by supplying the third switching signal to the third switching device to facilitate converting the alternating current electrical power into the direct current electrical power.

11. The computer-readable medium of claim 9, wherein the instructions to determine the first switching signal comprise instructions to:
determine, using the one or more processors, the first current polarity of the first phase, wherein the first current polarity is:
positive when current of the first phase flows from the alternating current power source to the power conditioning unit; and
negative when the current of the first phase flows from the power conditioning unit to the alternating current power source;
set, using the one or more processors, the first switching signal to a low state when the first current polarity is negative, wherein the low state comprises a second voltage less than a threshold voltage of the first switching device; and
set, using the one or more processors, the first switching signal to the control signal when the first current polarity is positive, wherein the control signal alternates between the low state and a high state that comprises a third voltage greater than the threshold voltage of the first switching device.

12. The computer-readable medium of claim 9, wherein the instructions to adjust the duty cycle of the control signal comprise instructions to:
determine a target voltage of the direct current electrical power, wherein the target voltage comprises a second voltage the direct current load is designed to operate using;
increase the duty cycle of the control signal when the first voltage is greater than the target voltage; and
decrease the duty cycle of the control signal when the second voltage is less than the target voltage.

13. The computer-readable medium of claim 9, comprising instructions to determine, using the one or more processors, the first current polarity based at least in part on first sensor data received from a first one or more sensors coupled to the power conditioning unit, a first electrical connection coupled between the alternating current source and the power conditioning unit, or both;
wherein the instructions to determine the first voltage of the direct current electrical power comprise instructions to determine the first voltage based at least in part on second sensor data received from a second one or more sensors coupled to the power conditioning unit, a second electrical connection coupled between the power conditioning unit and the direct current load, or both.

14. The computer-readable medium of claim 9, comprising instructions to:
determine, using the one or more processors, a first current of the direct current electrical power;
determine, using the one or more processors, a second current of the first phase of the alternating current electrical power;
determine, using the one or more processors, a second voltage of the first phase of the alternating current electrical power;
determine, using the one or more processors, a correlation between the first switching signal, the first voltage of the direct current electrical power, the first current of the direct current electrical power, the second voltage of the first phase of the alternating current electrical power, the second current of the first phase of the alternating current electrical power, or any combination thereof; and
perform, using the one or more processors, diagnostics on the alternating current power source, the power conditioning unit, the direct current load, or any combination thereof based at least in part on the correlation.

15. A method for controlling operation of a power conditioning unit in an electrical system, comprising:
determining, using a controller in the electrical system, a voltage of direct current electrical power supplied from the power conditioning unit to a direct current load;
instructing, using the controller, a plurality of switching devices to increase closed duration when the voltage of the direct current electrical power is greater than a target voltage the direct current load is configured to consume, wherein the power conditioning unit comprises a plurality of phase legs each configured to receive one phase of alternating current electrical power from a respective winding in an alternating current power source and each comprising one of the plurality of switching devices and a diode;
instructing, using the controller, the plurality of switching devices to decrease the closed duration when the voltage of the direct current electrical power is less than the target voltage;
comparing the power conditioning unit and/or alternating current power source health indicator to a predefined threshold; and
setting an alarm flag responsive to the comparison.

16. The method of claim 15, comprising:
generating, using the controller, a control signal, wherein the control signal comprises a pulse-width modulated signal that alternates between a high state greater than a threshold voltage of the plurality of switching devices and a low state lower than the threshold voltage;

determining, using the controller, a plurality of switching signals, wherein each of the plurality of switching signals is determined based at least in part on the control signal and current polarity of the one phase of the alternating current electrical power supplied to a corresponding one of the plurality of phase legs, wherein each of the plurality of switching signals is set to:

the high state when the current polarity is negative; and the control signal when the current polarity is positive;

wherein:

instructing the plurality of switching devices to increase the closed duration comprises increasing duty cycle of the control signal; and instructing the plurality of switching device to decrease the closed duration comprises decreasing the duty cycle of the control signal.

17. The method of claim 15, wherein:

instructing the plurality of switching devices to increase the closed duration comprises instructing a first switching device on a first phase leg of the plurality of phase legs to reduce duration a first phase of the alternating current electrical power flows through a first diode on the first phase leg; and instructing the plurality of switching device to decrease the closed duration comprises instructing the first switching device to increase the duration the first phase flows through the first diode.

18. The method of claim 15, comprising:

determining, using the controller, whether a fault is expected to be present in the direct current load; and instructing, using the controller, each of the plurality of switching devices to close to short the respective winding with other windings of the alternating current power source when the fault is expected to be present.

* * * * *